United States Patent [19]
Clark et al.

[11] Patent Number: 5,390,211
[45] Date of Patent: Feb. 14, 1995

[54] OPTICAL PARAMETRIC OSCILLATOR WITH UNSTABLE RESONATOR

[75] Inventors: James B. Clark, Campbell; Bertram C. Johnson, Sunnyvale, both of Calif.

[73] Assignee: Spectra-Physics Lasers, Inc., Mountain View, Calif.

[21] Appl. No.: 111,082

[22] Filed: Aug. 24, 1993

[51] Int. Cl.$^6$ ............................................. H01S 3/08
[52] U.S. Cl. .................................. 372/95; 372/21; 372/92; 372/99; 372/69; 372/22; 372/97; 359/328
[58] Field of Search ............... 372/95, 21, 22, 97, 372/92, 69; 359/328

[56] References Cited

U.S. PATENT DOCUMENTS

| | | | |
|---|---|---|---|
| 3,934,154 | 1/1976 | Cook | 359/328 |
| 4,156,209 | 5/1979 | Herbst et al. | 372/95 |
| 4,360,925 | 11/1982 | Brosnan et al. | 372/95 |
| 4,477,909 | 10/1984 | Salvi et al. | 372/95 |
| 4,639,923 | 1/1987 | Tang et al. | 372/21 |
| 5,134,622 | 7/1992 | Deacon | 372/21 |
| 5,144,630 | 9/1992 | Lin | 372/92 |
| 5,195,104 | 3/1993 | Geiger et al. | 372/97 |
| 5,296,960 | 3/1994 | Ellingson et al. | 372/22 |

OTHER PUBLICATIONS

Hecht, Eugene, Hecht Optics, 2d Ed., published 1987 by Addison–Wesley Publishing Co., Inc.
Koechner, Walter, Solid–State Laser Engineering 2d Ed., published 1988 by Springer–Verlag.

Primary Examiner—Léon Scott, Jr.
Attorney, Agent, or Firm—Haynes & Davis

[57] ABSTRACT

A high powered OPO system which produces a substantially collimated, low divergence output beam is based on the use of an unstable resonator. An optical parametric gain medium, such as beta-barium borate ($\beta$-BBO), lithium tri-borate (LBO), cesium borate (CBO), potasium tri-phosphate (KTP), or other similar materials is mounted within the unstable resonator with suitable tuning mechanisms. Optics are provided for supplying a pump beam through the optical parametric gain medium to induce gain. In a preferred system, the unstable resonator comprises a positive branch, confocal unstable resonator. Further the unstable resonator may be injection seeded for a narrow linewidth output.

50 Claims, 2 Drawing Sheets

OPTICAL PARAMETRIC OSCILLATOR WITH UNSTABLE RESONATOR

CROSS-REFERENCE TO RELATED APPLICATION

The present application is related to U.S. patent application entitled MASTER OPTICAL PARAMETRIC RESONATOR/POWER OPTICAL PARAMETRIC RESONATOR, Ser. No. 08/111,083, filed on the same day as the present application, and invented by Sobey, et al. This related application was owned at the time of invention and is currently owned by the same assignee as the present application.

BACKGROUND OF THE INVENTION

1. Field of the Invention

The present invention relates to laser systems, and more particularly to optical parametric oscillators for producing relatively high power collimated output beams with low divergence.

2. Description of Related Art

An optical parametric oscillator (OPO) is based on the use of nonlinear optical material within a resonant cavity. As the nonlinear crystal is pumped within the resonator, frequency mixing results in generation of a so called signal beam and a so called idler beam. The pump energy induces gain in both the signal beam and the idler beam, one or both of which can be selected for output using wave length selective elements. Furthermore, the wave lengths of the signal and idler beams can be tuned over a wide range of outputs by adjusting the angular alignment and/or temperature of the non-linear crystal. Thus, the OPO provides one technology for solid state tunable laser systems.

However, high power OPOs tend to operate with larger beam diameters and with large numbers of transverse modes, and are therefore sometimes referred to as highly multimode resonators. Also, high power OPOs using injection seeding suffer interference in the output transverse modes caused by the injection seeding and other parameters of the high power system. For these reasons, highly multimode OPO resonators have not been able to produce a collimated output with low divergence. Thus, for users that require collimated output with low divergence, such as might be used for driving harmonic generators or other similar systems, the highly multimode aspect of OPOs is undesirable.

Accordingly, it is desirable to provide a high power OPO system for producing a low divergence collimated beam overcoming the problems with prior OPO designs.

SUMMARY OF THE INVENTION

The present invention provides a high powered OPO system which produces a substantially collimated low divergence output beam based on the use of an unstable resonator. An optical parametric gain medium, such as beta-barium borate ($\beta$-BBO), lithium tri-borate (LBO), cesium borate (CBO), potassium titanyl-phosphate (KTP), or other similar materials, is mounted within the unstable resonator with suitable tuning mechanisms. A means is provided for supplying a pump beam through the optical parametric gain medium to induce gain. In a preferred system, the unstable resonator comprises a confocal unstable resonator, and more particularly a positive branch, confocal unstable resonator.

The unstable resonator in one aspect comprises a high reflector having a concave reflective surface facing the resonant cavity with a radius of curvature $R_{HR}$ and an output coupler having a convex reflective surface facing the resonant cavity with a radius of curvature $R_{OC}$ and spaced away from the high reflector by cavity length L, to define a resonant cavity with a cavity magnification of greater than 1.0.

The output coupler in the referred system comprises a meniscus output coupler having a concave outside surface with a radius substantially equal to radius of curvature $R_{OC}$ of the convex surface facing the cavity.

While it is desirable to maintain the cavity length of the OPO as small as possible to increase the efficiency of the OPO, according to one aspect of the invention, the radius of curvature $R_{HR}$ of the reflective surface on the high reflector is approximately equal to the radius of curvature $R_{OC}$ of the reflective surface on an output coupler, plus two times the cavity length 2L.

The output coupler may be implemented with a graded reflectivity profile, such as a substantially gaussian or super-gaussian profile, to improve the characteristics of the output beam. Also, the output coupler may include a highly reflective central region, known as a dot reflector. Another optional feature of the unstable resonator comprises an apodizing element to limit the output beam diameter, other than the effective aperture of the gain medium.

Using the system according to the present invention, a relatively high power, low divergence output beam is achieved. The system is particularly suited for generating outputs in the visible range with high gain non-linear crystals such as $\beta$-BBO.

Other aspects and advantages of the present invention can be seen upon review of the figures, a the detailed description and the claims which follow.

DETAILED DESCRIPTION

Figure 1:
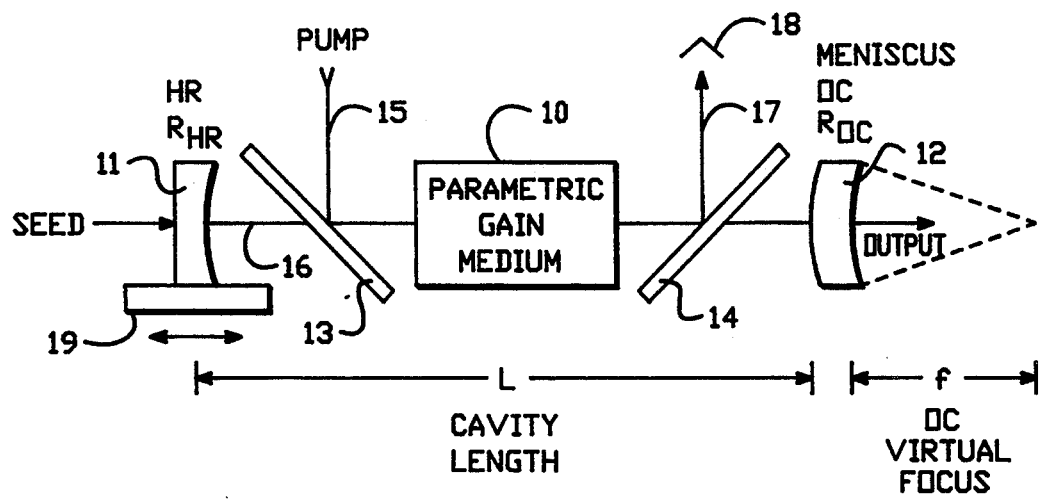
FIG. 1 is schematic diagram of a optical parametric oscillator according to the present invention.
Figure 2:
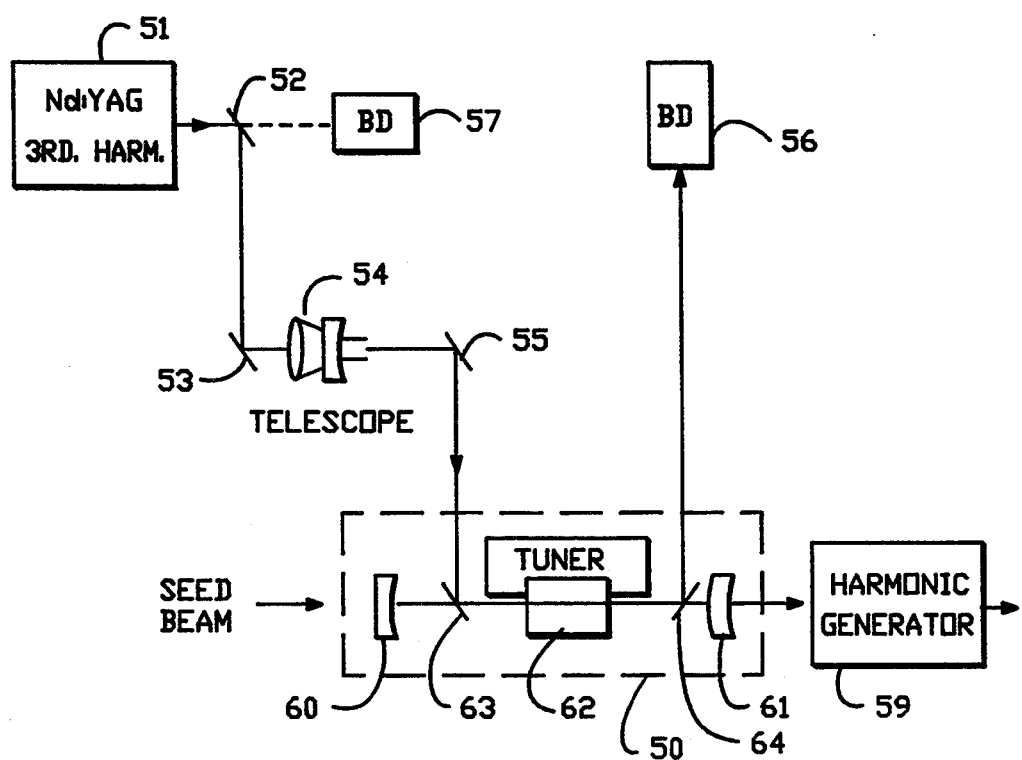
FIG. 2 is a layout diagram of an experimental system utilizing the OPO of the present invention.
Figure 3:
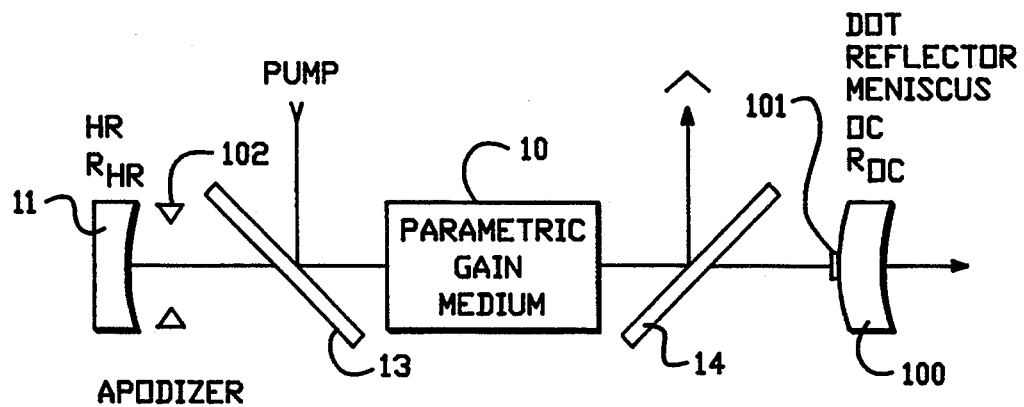
FIG. 3 is a schematic diagram of an alternative embodiment of the OPO of the present invention.
Figure 4:
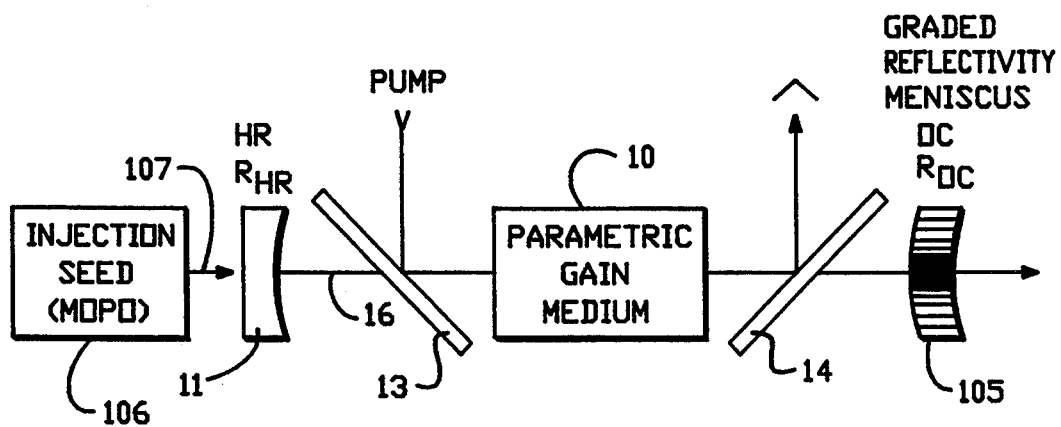
FIG. 4 is a schematic diagram of yet another alternative of embodiment of the OPO of the present invention.

A detailed description of preferred embodiments of the present invention is provided with respect to FIGS. 1 through 4. With reference to FIG. 1, the parameters of design of an OPO with a confocal, positive branch unstable resonator according to the present invention is provided. FIG. 2 illustrates an experimental setup used for testing the design illustrated with respect to FIG. 1. FIGS. 3 and 4 provide alternative resonator designs.

As can be seen in FIG. 1, the OPO according to the present invention includes an optical parametric gain medium 10 mounted within an unstable resonator. The unstable resonator is defined by a high reflector 11 having a plano outside surface and a concave inside surface with a radius of curvature $R_{HR}$. In addition, an output coupler 12 is included with a convex reflecting surface facing the high reflector 11 having a radius of curvature $R_{OC}$. The output coupler 12 in the preferred system is a meniscus type output coupler with a concave outside surface having a radius of curvature substantially equal to the radius of curvature $R_{OC}$. The output coupler may have a slight wedge to prevent parasitic oscillations and etalon effects. Also, a concave/plano output coupler with an anti-reflective coating on the back plano surface and a slight wedge may be suitable for some applications.

An input dichroic mirror 13 and an output dichroic mirror 14 are included within the resonant cavity for directing a pump beam through the parametric gain medium 10. Thus, a pump beam is supplied along path 15 into dichroic mirror 13 which is mounted at −45 degrees to the optical path 16 of the resonator. The pump beam 15 then is directed through the parametric gain medium 10 to dichroic mirror 14 mounted at +45 degrees to the optical path 16. At dichroic mirror 14, the remaining pump beam is reflected along path 17 out of the resonant cavity to a beam blocking mechanism, schematically shown at 18. Alternatively, dichroic mirror 14 may be configured at 90 degree to the optical path to reflect the pump beam back for a second pass through the gain medium.

This structure defines a confocal, positive branch unstable resonator having a cavity length L, which in design is minimized for efficiency of gain in the OPO. The short cavity length ensures the greatest number of passes of a given photon through the gain medium during a pumping interval, and therefore maximum gain.

As illustrated in FIG. 1, the high reflector 11 is mounted on an adjustable base 19 so that fine adjustments of the cavity length L can be made.

Excellent beam divergence control in the OPO power oscillator shown in FIG. 1 has been achieved with a convex/concave output coupler 12, a plano/concave high reflecting mirror 11 with curvatures and spacing such as the cavity magnification M is greater than 1.0. Good collimation of the signal and idler output beams of the OPO are achieved if the curvature and spacing of the high reflector 11 are set such that its focal point is approximately coincident with the virtual focus of the output coupler. As can be seen in FIG. 1, the output coupler virtual focus "f" will occur at a location approximately $R_{OC}/2$ from the output coupler 12. Thus, cavity parameters can be calculated as follows:

$$R_{HR}/2 \approx L + f$$
$$\approx L + R_{OC}/2;$$

or $$R_{HR} \approx R_{OC} + 2L$$

With the cavity length L minimized to maximize OPO efficiency, the positive branch, confocal, unstable resonator can be designed. Thus for instance, with a high reflector 11 having a radius $R_{HR}$ of 1.0 meters, and the cavity length of approximately 0.17 meters, an output coupler having a radius of approximately 0.7 meters was found to work very well. In one commercial system, the cavity length of 0.17 meters, with a high reflector having radius $R_{HR}$ of 1.0 meters and an output coupler with radius $R_{OC}$ as 0.75 meters has been chosen.

The calculations set forth above are approximations because the optical length of the cavity depends upon the materials in the OPO, in the reflectors and in other components of the cavity. Thus, fine adjustment of a particular implementation may be required for optimum performance. Also, practical consideration in layout of the resonator will effect the ability to precisely lay out the resonator according to the equation set out above.

The parametric gain medium 10 according to the preferred embodiment comprises beta-barium borate (β-BBO) which has an operable range from as low as 400 nanometers to greater than 3,000 nanometers. Other high gain OPO material such as lithium tri-borate (LBO), cesium borate (CBO), potassium titanyl-phosphate (KTP) and other non-centrosymmetric crystals having a nonlinear polarizability, wide optical transmission, and large non-linear coefficient may be utilized. Furthermore, the gain medium 10 (schematically illustrated in the Figures) includes such mechanisms as necessary for tuning the gain medium by tilting and rotating the same as known in the art.

An experimental setup of a system according to FIG. 1 is shown in FIG. 2. The system includes an OPO 50 implemented as described with respect to FIG. 1. The OPO is pumped with the third harmonic of an Nd:YAG laser system 51, such as the GCR-4(10) injection seeded Nd:YAG laser system available from Spectra-Physics Lasers, Inc., of Mountain View, Calif. The output of the pump laser 51 is supplied through dichroic mirror 52 and dichroic mirror 53 through a telescope 54 to adjust the diameter of the pump beam. The telescope is configured to provide magnification of 0.75:1. The output of the telescope 54 supplied through a UV turning mirror 55 into the cavity 50 as described above with respect to FIG. 1. The pump beam which escapes the cavity is supplied to a beam dump structure 56. Similarly, leaking radiation through dichroic mirror 52 is supplied to a beam dump mechanism 56. One such application is for harmonic generation as schematically represented by the harmonic generator 59.

In the OPO 50 the configuration of FIG. 2, a high reflector 60 was used which was formed with a plano/concave high reflector having a high reflecting coating optimized from 510 to 570 nanometers with a radius $R_{HR}$ of 1 meter. The output coupler 61 is formed with a convex/concave meniscus output coupler with a 25% reflectivity at 1.064 microns and a similar reflectivity in the visible range, and with an anti-reflective coating on the back concave surface. The gain medium 62 is beta-barium borate (β-BBO). The UV dichroic mirrors 63 and 64 were placed in the cavity. The pump power with the third harmonic of the Nd:YAG at approximately 355 nanometers ranged from 15 to 800 millijoules per pulse. Relatively large aperture optics are used for generating an output beam with a diameter in the range of 7 to 8 millimeters, to support high pump powers with energy densities low enough to prevent damage on the optics. The gain medium 62 is coupled with a tuning mechanism 66 as known in the art used for adjusting the angular alignment of the crystal in the parametric gain medium 62.

A KG-3 (IR blocking) filter was inserted into the cavity to test the system. The filter did not extinguish oscillation and did not change the spatial mode distributions. This means that the OPO of the present invention obtains a low divergence beam from the unstable resonator, oscillating in the signal wave length only. Thus, with the gain medium 62 tuned to a signal of 532 nanometers and an idler of 1,064 nanometers, an output signal beam of 75 millijoules per pulse and an idler beam of 25 millijoules per pulse was achieved with a pump beam of approximately 400 millijoules per pulse.

Also, when the wave length was tuned by altering the crystal angles over most of the tuning range of the available optics, the low divergence characteristic of the output beam was retained.

A preferred output coupler for the visible range might be designed according to preliminary analysis with a single layer of hafnia on an anti-reflective coating optimized for reflectivity as an output coupler at 400 nanometers. Analysis shows that the reflectivity for wave lengths in a range from 400 to 700 nanometers for such an optic will taper to a reduced reflectivity towards the higher wave lengths. However, because of the gain profile in the beta-barium borate optical parametric gain medium increases as the wave length goes from 400 to 700 nanometers, such an optic would appear highly satisfactory for tunable system over such wavelength range.

FIGS. 3 and 4 illustrate alternative resonator designs for use of the present invention. The reference numbers used in FIGS. 3 and 4 are the same as those used in FIG. 1 for like components. Thus, only the differences are described in the text.

The embodiment of FIG. 3 alters the design of the resonator by the use of a dot reflector meniscus output coupler 100. The dot reflector has a central region 101 of relatively high reflectivity over the range of interest. This improves the gain of the resonator. A highly collimated output beam can be achieved; however, a "hole" in the center of the beam is created.

In addition, the resonator may be supplemented with an apodizing element shown schematically by the symbol 102. The apodizing element may consist of an aperture within the resonate cavity, or coating on the optics, such as a highly reflective region around the outside edge of the output coupler 110. The apodizing element can be used to control the outside diameter of the output beam for such applications which require a smaller beam. Alternatively, the outside diameter is controlled by the effective aperture of the parametric gain medium 10, or other optics in the cavity.

FIG. 4 illustrates yet another alternative embodiment. In the embodiment of FIG. 4, the output coupler is replaced with a graded reflectivity meniscus output coupler 105 having a radially varying reflectivity profile. In the preferred system, the graded reflectivity output coupler has a gaussian or super-gaussian profile, to achieve high quality output in a highly collimated beam. See, for instance, co-pending U.S. patent application by Herbst entitled MULTI-LAYER GRADED REFLECTIVITY MIRROR, METHOD AND APPARATUS FOR MANUFACTURE OF SAME, AND LASER RESONATOR USING SAME, Ser. No. 08/824,715, filed Jan. 17, 1992, which is owned now and was owned at the time of invention by the same assignee as the present application.

FIG. 4 also illustrates another aspect of the use of OPOs for power oscillators. In particular, the power OPO may be injection seeded using a laser system 106 which supplies a seed beam 107 transversely along the optical path 16 the resonant cavity. In a preferred system, the injection seeding laser system 106 may comprise a low power, narrow line width OPO. See copending U.S. application entitled Master Optical Parametric Oscillator/Power Optical Parametric Oscillator, Ser. No. 08/111,083, invented by Sobey, et al., and filed on the same day as the present application.

The present invention provides a system for generating a highly collimated, high power output from an OPO which has not been available in prior art, greatly advancing the art for further commercial exploitation of OPOs as solid state tunable laser systems.

The foregoing description of preferred embodiments of the invention has been provided for the purposes of illustration and description. It is not intended to be exhaustive or to limit the invention to the precise forms disclosed. Obviously many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An optical parametric oscillator comprising:
   an unstable resonator including a high reflector and an output coupler set such that a focal point of the high reflector is substantially coincident with a virtual focus of the output coupler to generate an output beam with transverse mode selectivity and controlled output beam divergence;
   an optical parametric gain medium mounted within the unstable resonator; and
   a pump source directing a pump beam into optical parametric gain medium.

2. The optical parametric oscillator of claim 1, wherein the unstable resonator comprises a confocal unstable resonator.

3. The optical parametric oscillator of claim 2, wherein the confocal unstable resonator comprises a positive branch, confocal unstable resonator.

4. The optical parametric oscillator of claim 1, wherein the unstable resonator comprises:
   a high reflector having a reflective surface facing the resonant cavity with a radius of curvature $R_{HR}$ and an output coupler having a reflective surface facing the resonant cavity with a radius of curvature $R_{OC}$ and spaced away from the high reflector by a cavity length L, to define a resonant cavity with a cavity magnification of greater than 1.0.

5. The optical parametric oscillator of claim 4, wherein the output coupler comprises a meniscus output coupler having a concave outside surface with a radius of curvature substantially equal to the radius of curvature $R_{OC}$.

6. The optical parametric oscillator of claim 5, wherein the radius of curvature $R_{HR}$ of the reflective surface on the high reflector is approximately equal to the radius of curvature $R_{OC}$ of the reflective surface on the output coupler plus two times the cavity length 2L.

7. The optical parametric oscillator of claim 5, wherein the reflective surface facing the resonant cavity on the output coupler has a graded reflectivity profile.

8. The optical parametric oscillator of claim 7, wherein the graded reflectivity profile is substantially gaussian.

9. The optical parametric oscillator of claim 5, wherein the reflective surface facing the resonant cavity on the output coupler includes a highly reflecting central region.

10. The optical parametric oscillator of claim 1, wherein the unstable resonator includes an apodizing element to limit output beam diameter.

11. The optical parametric oscillator of claim 1, wherein the optical parametric gain medium comprises beta-barium borate (β-BBO).

12. The optical parametric oscillator of claim 1, wherein the optical parametric gain medium comprises lithium tri-borate (LBO).

13. The optical parametric oscillator of claim 1, wherein the optical parametric gain medium comprises cesium borate (CBO).

14. The optical parametric oscillator of claim 1, wherein the optical parametric gain medium comprises potasium titanyl-phosphate (KTP).

15. An optical parametric oscillator comprising:
a high reflector having a reflective surface with a radius of curvature $R_{HR}$;
a meniscus output coupler having a reflective surface facing the high reflector with a radius of curvature $R_{OC}$ and spaced away from the high reflector by a cavity length L, to define an unstable resonant cavity, the high reflector and the output coupler being set such that a focal point of the high reflector is about coincident with a virtual focus of the output coupler to generate an output beam with transverse mode selectivity and controlled output beam divergence;
an optical parametric gain medium mounted within the unstable resonant cavity;
a pump source proding a pump beam; and
optics, coupled with the optical parametric gain medium, to direct the pump beam through the optical parametric gain medium to induce parametric gain.

16. The optical parametric oscillator of claim 15, wherein the radius of curvature $R_{HR}$ of the reflective surface on the high reflector is approximately equal to the radius of curvature $R_{OC}$ of the reflective surface on the meniscus output coupler plus two times the cavity length 2L.

17. The optical parametric oscillator of claim 15, wherein the reflective surface facing the resonant cavity on the output coupler has a graded reflectivity profile.

18. The optical parametric oscillator of claim 17, wherein the graded reflectivity profile is substantially gaussian.

19. The optical parametric oscillator of claim 15, wherein the reflective surface facing the resonant cavity on the output coupler includes a highly reflecting central region.

20. The optical parametric oscillator of claim 15, wherein the unstable resonator includes an apodizing element to limit output beam diameter.

21. The optical parametric oscillator of claim 15, wherein the optical parametric gain medium comprises beta-barium borate (β-BBO).

22. The optical parametric oscillator of claim 15, wherein the optical parametric gain medium comprises lithium tri-borate (LBO).

23. The optical parametric oscillator of claim 15, wherein the optical parametric gain medium comprises cesium borate (CBO).

24. The optical parametric oscillator of claim 15, wherein the optical parametric gain medium comprises potasium titanyl-phosphate (KTP).

25. An optical parametric oscillator for generating a low divergence, high power laser output, comprising:
an optical parametric gain medium;
a pump source producing an ultraviolet pump beam;
optics, coupled with the optical parametric gain medium, to direct the ultraviolet pump beam through the optical parametric gain medium to induce parametric gain in a selected wavelength within a visible range of wavelengths;
a high reflector for the visible range of wavelengths having a reflective surface with a radius of curvature $R_{HR}$; and
a meniscus output coupler for the visible range of wavelengths having a reflective surface facing the high reflector with a radius of curvature $R_{OC}$ and spaced away from the high reflector by a cavity length L, to define a confocal, positive branch, unstable resonant cavity, and produce a substantially collimated, low divergence output beam with transverse mode selectivity and controlled output beam divergence at the selected wavelength in response to pump energy.

26. The optical parametric oscillator of claim 25, wherein the radius of curvature $R_{HR}$ of the reflective surface on the high reflector is approximately equal to the radius of curvature $R_{OC}$ of the reflective surface on the meniscus output coupler plus two times the cavity length 2L.

27. The optical parametric oscillator of claim 25, wherein the reflective surface facing the resonant cavity on the output coupler has a graded reflectivity profile.

28. The optical parametric oscillator of claim 27, wherein the graded reflectivity profile is substantially gaussian.

29. The optical parametric oscillator of claim 25, wherein the reflective surface facing the resonant cavity on the output coupler includes a highly reflecting central region.

30. The optical parametric oscillator of claim 25, wherein the unstable resonator includes an apodizing element to limit output beam diameter.

31. The optical parametric oscillator of claim 25, wherein the optical parametric gain medium comprises beta-barium borate (β-BBO).

32. The optical parametric oscillator of claim 25, wherein the optical parametric gain medium comprises lithium tri-borate (LBO).

33. The optical parametric oscillator of claim 25, wherein the optical parametric gain medium comprises cesium borate (CBO).

34. The optical parametric oscillator of claim 25, wherein the optical parametric gain medium comprises potasium titanyl-phosphate (KTP).

35. The optical parametric oscillator of claim 25, further including:
means, coupled with the optical parametric gain medium, for selecting the selected wavelength.

36. The optical parametric oscillator of claim 35, wherein the means for selecting comprises an injection seeding system.

37. A laser system comprising:
a master optical parametric oscillator to generate a seed beam;
a power optical parametric oscillator, mounted with the master optical parametric oscillator to receive the seed beam for injection seeding, and including an unstable resonator and an optical parametric gain medium mounted within the unstable resonator, the unstable resonator including a high reflector and an output coupler set such that a focal point of the high reflector is about coincident with a virtual focus of the output coupler to generate an output beam with transverse mode selectivity and controlled output beam divergence; and a pump beam source directing a pump beam into the optical parametric gain medium.

38. The laser system of claim 37, wherein the unstable resonator comprises a confocal unstable resonator.

39. The laser system of claim 38, wherein the confocal unstable resonator comprises a positive branch, confocal unstable resonator.

40. The laser system of claim 37, wherein the unstable resonator comprises:

a high reflector having a reflective surface facing the resonant cavity with a radius of curvature $R_{HR}$ and an output coupler having a reflective surface facing the resonant cavity with a radius of curvature $R_{OC}$ and spaced away from the high reflector by a cavity length L, to define a resonant cavity with a cavity magnification of greater than 1.0.

41. The laser system of claim 40, wherein the output coupler comprises a meniscus output coupler having a concave outside surface with a radius of curvature substantially equal to the radius of curvature $R_{OC}$.

42. The laser system of claim 41, wherein the radius of curvature $R_{HR}$ of the reflective surface on the high reflector is approximately equal to the radius of curvature $R_{OC}$ of the reflective surface on the output coupler plus two times the cavity length 2L.

43. The laser system of claim 41, wherein the reflective surface facing the resonant cavity on the output coupler has a graded reflectivity profile.

44. The laser system of claim 43, wherein the graded reflectivity profile is substantially gaussian.

45. The laser system of claim 41, wherein the reflective surface facing the resonant cavity on the output coupler includes a highly reflecting central region.

46. The laser system of claim 37, wherein the unstable resonator includes an apodizing element to limit output beam diameter.

47. The laser system of claim 37, wherein the optical parametric gain medium comprises beta-barium borate ($\beta$-BBO).

48. The laser system of claim 37, wherein the optical parametric gain medium comprises lithium tri-borate (LBO).

49. The laser system of claim 37, wherein the optical parametric gain medium comprises cesium borate (CBO).

50. The laser system of claim 37, wherein the optical parametric gain medium comprises potassium titanyl-phosphate (KTP).

* * * * *